(12) United States Patent
Crosbie et al.

(10) Patent No.: US 9,992,735 B1
(45) Date of Patent: Jun. 5, 2018

(54) SYSTEM AND METHOD FOR VEHICLE WIRELESS CONNECTION MANAGEMENT

(71) Applicant: Excelfore Corporation, Fremont, CA (US)

(72) Inventors: John Crosbie, Fremont, CA (US); Shrikant Acharya, Fremont, CA (US)

(73) Assignee: Excelfore Corporation, Freemont, CA (US)

(*) Notice: Subject to any disclaimer, the term of this patent is extended or adjusted under 35 U.S.C. 154(b) by 0 days. days.

(21) Appl. No.: 15/443,401

(22) Filed: Feb. 27, 2017

(51) Int. Cl.
*H04W 48/16* (2009.01)
*H04W 4/02* (2018.01)
*H04W 84/12* (2009.01)
*H04W 64/00* (2009.01)

(52) U.S. Cl.
CPC .......... *H04W 48/16* (2013.01); *H04W 4/023* (2013.01); *H04W 64/00* (2013.01); *H04W 84/12* (2013.01)

(58) Field of Classification Search
CPC ...... H04L 61/609; H04L 67/22; H04W 4/008; H04W 88/08; H04W 4/023; H04W 4/027; H04W 4/028; H04W 84/005; H04W 4/02; H04W 48/20; H04W 4/04; H04W 88/02; H04W 48/16; H04W 84/12; G06Q 10/0833; G01C 21/00; G01C 21/30; G01C 21/3446; G01C 21/206; G01C 21/3667; G01C 21/3676; G07C 5/02; G07C 2209/63; G07C 5/00; G07C 5/08; G06F 17/30241; G06F 21/335; B60R 21/01512; B60R 2325/205; B60R 25/1004; B60R 25/31; B60R 25/33; H04N 21/41422; H04N 21/25841; G01S 19/42; G01S 5/0294; G01S 5/0263; G01S 13/931; G01S 19/51; G01S 2013/9357; B60P 3/007; H04M 1/72572; H04B 10/114; H04B 1/3827
See application file for complete search history.

(56) References Cited

U.S. PATENT DOCUMENTS

| 6,262,657 | B1 | 7/2001 | Okuda |
| 8,446,270 | B2 | 5/2013 | Shuster |
| 2001/0020893 | A1 | 9/2001 | Kawai et al. |
| 2007/0159354 | A1 | 7/2007 | Rosenberg |
| 2010/0232405 | A1* | 9/2010 | Kikuchi ............... H04W 4/001 370/338 |

(Continued)

*Primary Examiner* — Nizar Sivji
(74) *Attorney, Agent, or Firm* — Lempia Summerfield Katz LLC (57) ABSTRACT

A system and method for vehicle wireless connection management is disclosed. Vehicles may provide wireless connectivity to the Internet for associated mobile devices. The vehicle, using a vehicle access point management device, may manage whether to connect to a cellular wireless system or to another wireless system (such as a Wi-Fi access point external to the vehicle). In particular, the vehicle access point management device may access a location-based access point map that correlates potentially available Wi-Fi access points correlated to geographic locations, and using the current location of the vehicle and the location-based access point map, determine whether to attempt to connect to a Wi-Fi access point. In this way, the vehicle access point management device need not initially search for available Wi-Fi access points, which in a single Wi-Fi antenna vehicle, could potentially disrupt the Wi-Fi connection to the associated mobile devices.

17 Claims, 6 Drawing Sheets

(56) References Cited

U.S. PATENT DOCUMENTS

| | | |
|---|---|---|
| 2010/0234047 A1 | 9/2010 | Lipovski |
| 2011/0105097 A1 | 5/2011 | Tadayon et al. |
| 2012/0040652 A1 | 2/2012 | Lewis |
| 2012/0242474 A1 | 9/2012 | Oh et al. |
| 2013/0046510 A1 | 2/2013 | Bowne |
| 2013/0297097 A1 | 11/2013 | Fischer |
| 2013/0332063 A1 | 12/2013 | Pirwani et al. |
| 2014/0309914 A1 | 10/2014 | Scofield |
| 2014/0310610 A1* | 10/2014 | Ricci .................... H04W 48/04 715/744 |

* cited by examiner

SYSTEM AND METHOD FOR VEHICLE WIRELESS CONNECTION MANAGEMENT

TECHNICAL FIELD

This application relates generally to managing wireless connections, and more specifically, relates to managing wireless connections in a moving vehicle, such as an automobile.

BACKGROUND

Vehicles may have included therein access points providing one or more ways for mobile devices in the vehicle to wirelessly connect to other electronic devices. For example, the access points may comprise Wi-Fi, Bluetooth, or cellular connection (such as LTE). In this regard, the mobile devices may communicate with the access point via wireless near-field communication (e.g., Bluetooth) or via wireless local area networking (e.g., Wi-Fi), with the access point providing internet connectivity to the mobile devices via the cellular connection (e.g., LTE).

DETAILED DESCRIPTION

Vehicles, such as automobiles, trucks, tractors, farm equipment, fork lift trucks, may provide wireless connectivity for associated mobile devices. For example, a vehicle may include one or more access points, such as for Wi-Fi connectivity, Bluetooth connectivity and/or cellular connectivity (e.g., LTE). In practice, the mobile devices may be associated with the access point via a local area network, such as Wi-Fi, or via near-field communication, such as Bluetooth. The access point may thus provide Internet connectivity via the cellular connection to the associated mobile devices.

The access point may thus provide continuous Internet connection for the associated mobile devices. There may be instances where the access point manages the mobile devices' connections to the Internet. One such instance includes managing the transition between cellular modem in the vehicle and external qualified access points. In one example, an external qualified access point may include a Wi-Fi access point, external to the vehicle (such as a Wi-Fi access point in a store or a home). In a specific example, the vehicle may travel to a hardware store regularly used by an occupant of the vehicle. In this specific example, the Wi-Fi radio in the vehicle should be able to connect to the hardware store Wi-Fi access point for the Internet connection. Further, the mobile devices, currently connected to the Internet via the vehicle cellular modem, should be able to connect to the hardware store Wi-Fi access point for the Internet connection. Similarly, when the vehicle travels away from the hardware store Wi-Fi access point, the Wi-Fi signal will degrade to the point where the Internet connection should switch to the cellular modem in the vehicle. Likewise, the Wi-Fi signal to the mobile devices will degrade to the point that the mobile devices will connect, via vehicle Wi-Fi, to the vehicle cellular modem for connection to the Internet.

Periodically, due to cost and/or due to lack of cellular service, the vehicle access point may search for an external Wi-Fi access point. For example, communicating via the cellular modem may cost money. In that regard, the vehicle access point may search for the external Wi-Fi access point to communicate more cheaply. However, when the vehicle access point searches for the external Wi-Fi access point, communication service to the mobile devices may suffer. In particular, the vehicle access point may communicate with one or more mobile devices via Wi-Fi and may provide Internet connectivity via the cellular modem to these Wi-Fi connected mobile devices. When the vehicle access point searches for an external Wi-Fi access point, particularly where the vehicle access point has a single Wi-Fi radio, internet service to the mobile devices may degrade or may be disrupted. For example, in the case of a single Wi-Fi radio, the vehicle access point selects between providing Wi-Fi communication to the mobile devices, or searching for external Wi-Fi access points. In that regard, when the vehicle access point searches for external Wi-Fi access points, Wi-Fi service to the mobile devices may be momentarily disrupted.

In one implementation, a vehicle access point management device is provided to manage the wireless connections to the mobile devices. The vehicle access point management device may perform one or more wireless connection management functions, including without limitation: (1) determining when to search for an external Wi-Fi access point (or other type of external wireless access point); and (2) responsive to determining that an external Wi-Fi access point is available, determining when to switch to the available external Wi-Fi access point (or other type of external wireless access point). Though the below discussion focuses on Wi-Fi wireless communication, other types of wireless communication are contemplated.

With regard to the first function, the vehicle access point management device determines when to search for the external Wi-Fi access point in order to reduce disruption of Wi-Fi service to the mobile devices. To accomplish this, the vehicle access point management device may determine when to search for the external Wi-Fi access point based, at least in part, on the current location of the vehicle (such as the current location as determined by a GPS receiver resident in the vehicle). More specifically, the vehicle access point management device may access a wireless location-based map (such as a Wi-Fi location-based map), which is indicative of potentially available Wi-Fi access points correlated to location. In one implementation, the vehicle access point management device may build the Wi-Fi location-based map based on recording GPS locations when the vehicle access point communicates with an external Wi-Fi access point. In this way, the vehicle access point management device may subsequently use the current GPS location and the Wi-Fi location-based map to determine that it is likely an external Wi-Fi access point is available. In another implementation, the vehicle access point management device, instead of building the Wi-Fi location-based map, may receive the Wi-Fi location-based map from an external device. In still another implementation, the Wi-Fi location-based map may be partly received by the vehicle access point management device and may be partly build by the vehicle access point management device.

For example, the vehicle access point may have previously connected with (or previously sensed the signal for) an external Wi-Fi access point "X". The vehicle access point management device may record the GPS locations (such as at location "Y") at which the signal for external Wi-Fi access point "X" was sufficiently strong for communication. Subsequently, the vehicle may return to location "Y". In this subsequent trip, the vehicle access point management device may use the GPS receiver to determine that the vehicle is at location "Y", and use this location "Y" as an input to the Wi-Fi location-based map. Because the Wi-Fi location-based map correlates location to external Wi-Fi signal availability, the output of the Wi-Fi location-based map indicates that at location "Y", a Wi-Fi signal was previously available (in particular, external Wi-Fi access point "X"). Based on the output of the Wi-Fi location-based map (which indicates that a Wi-Fi signal was previously available), the vehicle access point management device may determine that it is likely that a Wi-Fi signal is available, and command the vehicle access point to search for the external Wi-Fi signal (e.g., search for external Wi-Fi "X"). In this way, the vehicle access point management device, based on the current location of the vehicle and the Wi-Fi location-based map, may command the vehicle access point to search for the external Wi-Fi signal only in response to a determination that the external Wi-Fi signal is likely present. This is in contrast to the vehicle access point periodically or constantly searching for the external Wi-Fi signal without an expectation that an external Wi-Fi signal is present. Thus, any disruption of Wi-Fi communication to the mobile device occurs is in response to determining that the external Wi-Fi signal is likely present.

With regard to the second function, in response to determining that an external Wi-Fi access point is available, the vehicle access point management device may determine when to become a client and switch to the available external Wi-Fi access point. As discussed above, one or more mobile devices may be clients to the vehicle Wi-Fi access point. In this regard, the vehicle access point management device becoming itself a client to the external Wi-Fi access point will cause to terminate all Wi-Fi service to the all client mobile devices. To account for this, the vehicle access point management device may determine, based on one or more parameters, when to become a client and switch to the available external Wi-Fi access point. As discussed in more detail below, the parameters may include any one, any combination, or all of the following: (1) whether any devices are currently in Wi-Fi communication with the vehicle access point; (2) the priority of any of the devices are currently in Wi-Fi communication with the vehicle access point; and (3) whether one, some, or all of devices that are currently in Wi-Fi communication with the vehicle access point have consented to the become clients to the external Wi-Fi access point. Based on these parameter(s), the vehicle access point management device may determine when to become a client to the available external Wi-Fi access point. For example, the vehicle access point management device may determine to immediately become a client to the available external Wi-Fi access point. As another example, the vehicle access point management device may wait until approval from Wi-Fi connected mobile devices to an external Wi-Fi access point. As still another example, the vehicle access point management device may wait until the Wi-Fi connected mobile devices cease Wi-Fi communication with the vehicle access point.

Alternatively, or in addition, the vehicle access point management device may determine which access point to connect to based on the cost incurred to become connected (e.g., whether the connection to the Internet is free or a subscription-based connection). For example, a telecommunication company may be a subscription-based service whereby if a person has an account with the telecommunication company, the telecommunication company may decide whether there is a free or a subscription-based connection.

Thus, the vehicle, using a vehicle access point management device, may manage whether to connect to a cellular wireless system or to another wireless system (such as a Wi-Fi access point external to the vehicle). In particular, the vehicle access point management device may access that location-based access point map that correlates potentially available Wi-Fi access points correlated to geographic locations, and using the current location of the vehicle and the location-based access point map, determine whether to attempt to connect to a Wi-Fi access point. In this way, the vehicle access point management device need not initially search for available Wi-Fi access points, which in a single Wi-Fi antenna vehicle, could potentially disrupt the Wi-Fi connection to the associated mobile devices.

Figure 1:
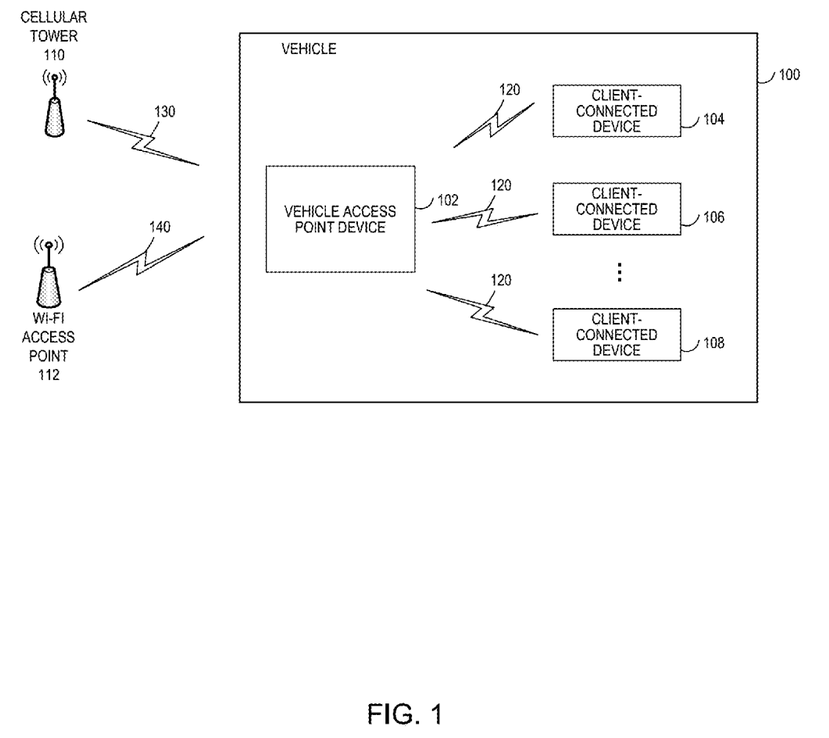
FIG. 1 is a block diagram of the system, including electronic devices internal and external to the vehicle.

Referring to the figures, FIG. 1 is a block diagram of the system, including electronic devices internal and external to the vehicle. In particular, FIG. 1 illustrates the vehicle 100, cellular tower 110, and Wi-Fi access point 112. The vehicle 100 includes vehicle access point device 102 and client-connected devices 104, 106, and 108. Client-connected devices 104, 106, and 108 may include any electronic device configured for wired or wireless communication, such as smart phones, tablets, or computers. As illustrated in FIG. 1, client-connected devices 104, 106, and 108 communicate wirelessly via a wireless signal 120 with the vehicle access point device 102. One or more wireless communication protocols are contemplated for wireless signal 120. For example, wireless signal 120 may comprise a Wi-Fi signal or a Bluetooth signal. Other wireless signals are contemplated.

The vehicle 100, via vehicle access point device 102, may communicate with electronic devices external to the vehicle 100, such as cellular tower 110 and Wi-Fi access point 112. Cellular tower 110 is part of a cellular or mobile network, which is one example of wireless communication via a radio frequency. Wi-Fi access point 112 is an example of an access point that is external to the vehicle 100 and that uses a wireless communication other than cellular. Wi-Fi access point 112 may have a unique identification, such as an access point ID. The access point ID uniquely identifies an access point for Wi-Fi radios to connect for tethered connection to the Internet. One example of an access point ID is a service set identifier (SSID), which may be a sequence of 0-32 octets, may be used as an identifier for a wireless LAN, and is intended to be unique for a particular area.

Vehicle access point device 102 may communicate with cellular tower 110 via a first set of frequencies (illustrated as 130) and may communicate with Wi-Fi access point 112 via a second set of frequencies (illustrated as 140).

Figure 2:
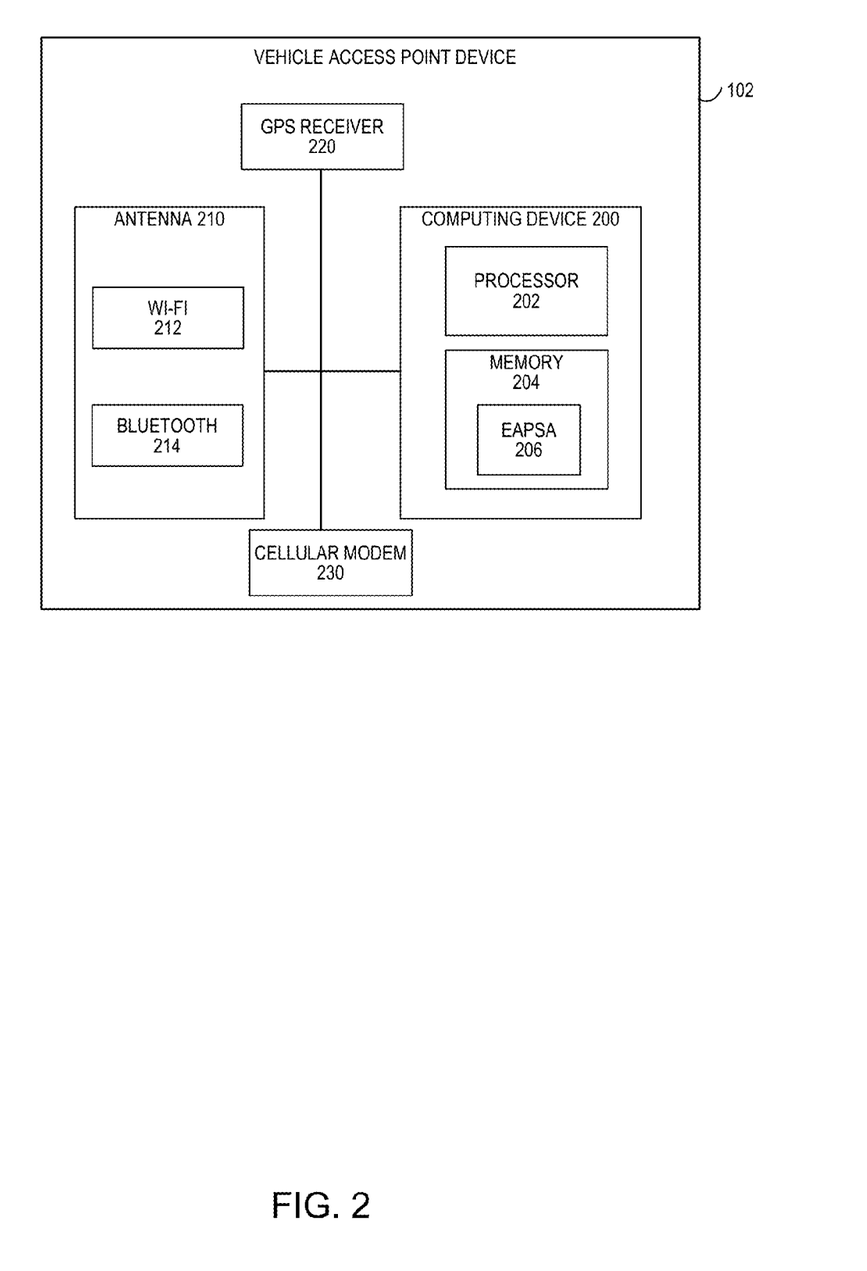
FIG. 2 is a block diagram of the vehicle access point device.

FIG. 2 is a block diagram of the vehicle access point device 102. Vehicle access point device 102 includes a computing device 200, an antenna 210, a GPS receiver 220, and a cellular modem 230. Antenna 210 may comprise a smart antenna, which is a class of devices that houses multiple radios that connect to the outside world to provide one, any combination, or all of the following: Internet access; AM/FM Radio; Sirius XM Radio; GPS; SDARS and LTE; BTLE/Wi-Fi. As illustrated in FIG. 2, antenna 210 includes functionality to communicate via Wi-Fi radio 212 and via Bluetooth 214. For example, Wi-Fi radio 212 may act as a transmitter/receiver in tandem, acting as an access point or a Wi-Fi client. FIG. 2 is merely for illustration purposes.

In this regard, the vehicle access point device 102 may operate in one of several modes. In Wi-Fi access point mode, mobile devices connected to the vehicle access point device 102 gain network access to the Internet via cellular modem 230. In particular, Wi-Fi Access point mode can accommodate several simultaneous client connections. Thus, antenna 210 may use a LTE modem (such as cellular modem 230) through which Internet access is provided to the connected mobile devices (connected to the Wi-Fi radio 212). In Wi-Fi client mode, the Wi-Fi Radio 212 is in a client mode connecting to an external Wi-Fi access point (such as Wi-Fi access point 112), providing the system internet access without using cellular modem 230. This connection may result in higher data rates and may be a cheaper or zero-cost connection.

GPS receiver 220 is a device that is capable of receiving information from GPS satellites, and then accurately calculating its geographic location. In this regard, GPS receiver 220 relies on the Geo Positional Satellite System to establish the location of the GPS receiver 220. GPS receiver 220 is one example of a location generating device. Other location generating devices are contemplated.

The computing device 200 may include a processor 202 and a memory 204. The processor is one example of a controller for a computing device. The memory may include External Access Point Scanning Agent (EAPSA) 206. EAPSA may include one or both of the following functionality: (1) determining when to search for an external Wi-Fi access point; and (2) responsive to determining that an external Wi-Fi access point is available, determining when to switch to the available external Wi-Fi access point. Computing device 200, executing the EAPSA 206, is one example of the vehicle access point management device.

In one implementation, the EAPSA 206 may comprise a software process that is responsible for switching the Wi-Fi radio between the Wi-Fi access point mode and the Wi-Fi client mode. In one specific implementation, normal operation will be in Wi-Fi access point mode, while it continues to scan in the background for an external access point (such as Wi-Fi access point 112). When a known external access point is available, EAPSA 206 may switch the Wi-Fi radio 212 into Wi-Fi client mode, as discussed in more detail below.

External access points can be detected using stored GPS coordinates and stored SS IDs. If a match were to occur, EAPSA 206 may determine when to connect to the external access point. In one example, EAPSA 206 may generate an alert callback to the connected mobile device to notify that a match to an external access point has occurred. Similarly, when an external access point begins to fade, EAPSA 206 may again generate an alert call back to the previously connected mobile device.

Memory may further include secure software, which may include functionality for firewalling of incoming data so that rogue intrusions are prevented from communicating with the controls in the vehicle 100 and/or the infotainment system.

Figure 3:
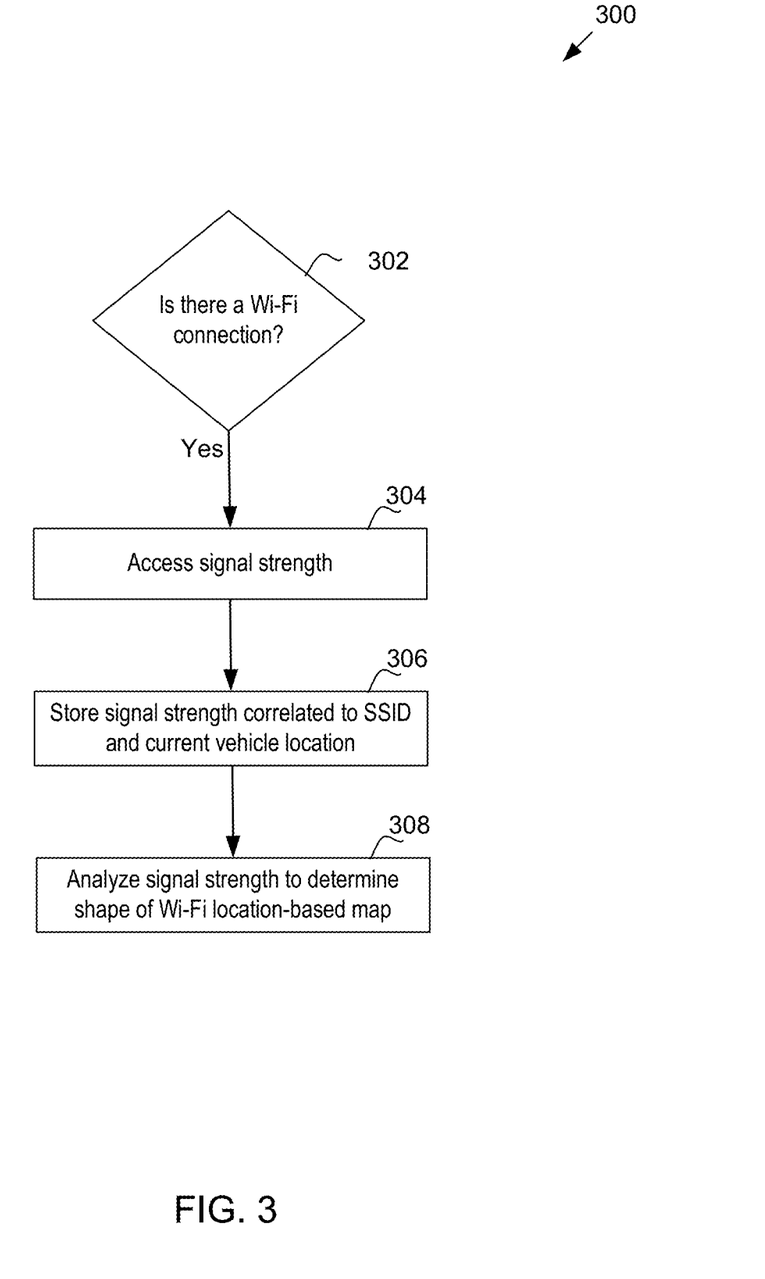
FIG. 3 is a flow diagram for generating a Wi-Fi location-based map.

FIG. 3 is a flow diagram 300 for generating a Wi-Fi location-based map. At 302, it is determined whether there is a Wi-Fi connection. If so, at 304, the signal strength is accessed. Further, at 306, the signal strength is stored and correlated with the SSID, or other identification of the external Wi-Fi access point, and with the current location of the vehicle (e.g., the location as determined by the GPS receiver). At 308, the stored signal strengths may then be analyzed to determine the shape of the Wi-Fi location-based map.

The Wi-Fi location-based map may take one of several forms. In one form, the Wi-Fi location-based map may include two points for each respective external Wi-Fi access point previously encountered. For example, the first point may comprise the location at which the signal strength for the respective external Wi-Fi access point is strongest, and the second point may comprise the radius at which the signal strength was sufficient to connect to the respective external Wi-Fi access point. In this way, the radius may be an example of a geofence, or perimeter circumference that is established which when crossed to get inside or to get outside triggers an alert in the EAPSA 206, discussed below. In another form, the Wi-Fi location-based map may include a series of points for each respective external Wi-Fi access point previously encountered that defines an irregular shape. For example, the shape may be non-circular in nature. Thus, in one implementation, the Wi-Fi location-based map may have as an input GPS coordinates, and as an output of qualified and authenticated access points that the Wi-Fi radio may use.

EAPSA 206 may have an additional feature that it learns from its repeated connection to the authenticated and qualified list of external access points. EAPSA 206 may add qualifiers to its internal list (e.g., a distance versus signal strength map to all the access points in its internal list). EAPSA 206 may then create a geo-fence for each access point. When EAPSA 206 determines that the vehicle has entered a geo-fence of a qualified external access point, then EAPSA 206 may initiate a connection to minimize service interruption. For example, a geo-fence could be 500 ft. In this instance, when a geo-fence is breached which is set for 500 ft, then the process may begin the operation to connect to the external access point.

Figure 4:
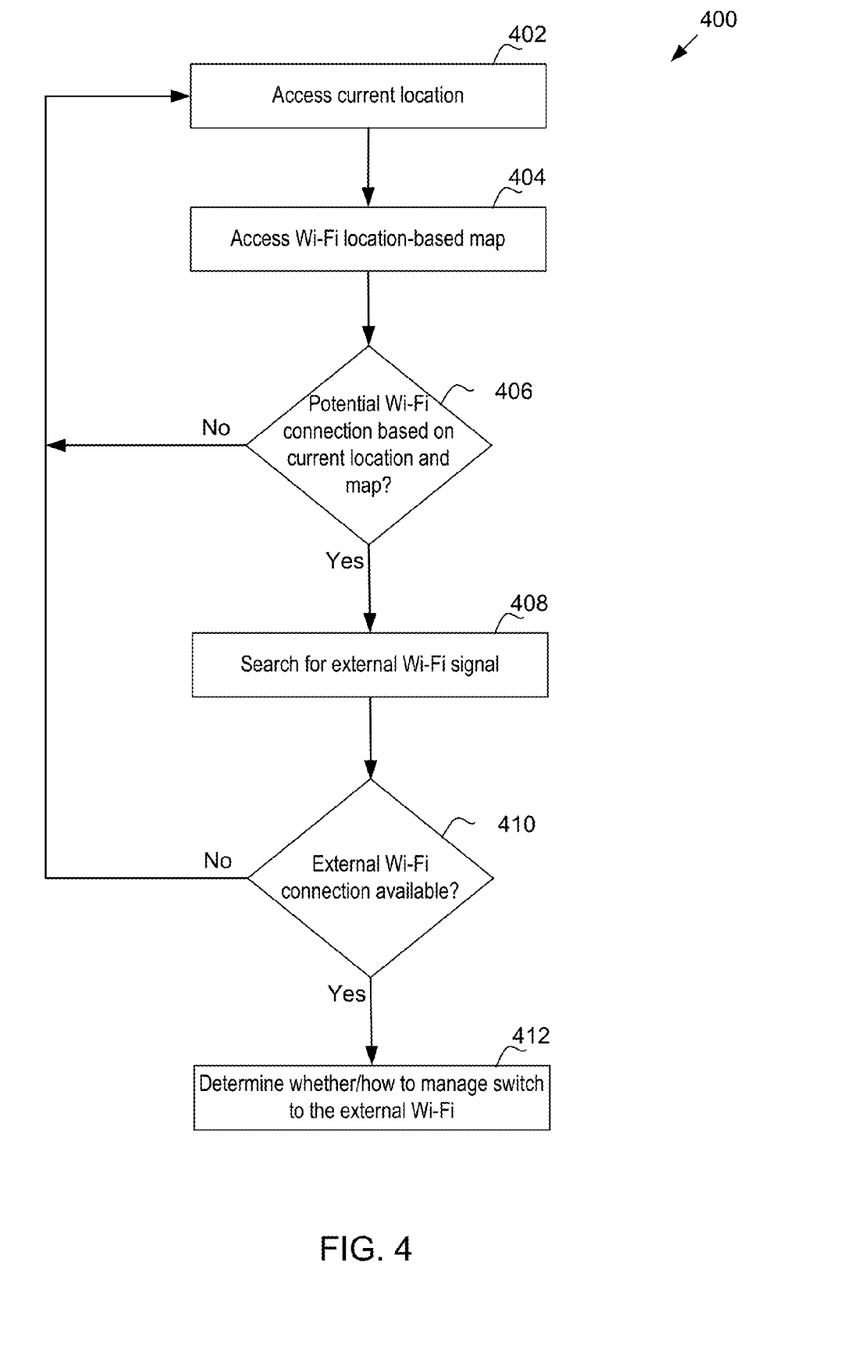
FIG. 4 is a flow diagram for determining whether to trigger a check for an available Wi-Fi connection.

FIG. 4 is a flow diagram 400 for determining whether to trigger a check for an available Wi-Fi connection. As discussed above, the antenna may include a single Wi-Fi radio. Alternatively, the antenna may include multiple Wi-Fi radios. The below discussion focuses on the antenna including a single Wi-Fi radio; however, the discussion herein may likewise be applied to an antenna with multiple Wi-Fi radios.

In the instance of multiple Wi-Fi radios (such as two Wi-Fi radios), one Wi-Fi radio may be permanently configured as a client and always looking to connect to an external access point and the second radio may be a permanent access point (e.g., providing Wi-Fi service to the connected mobile wireless devices in the vehicle). In this configuration, when EAPSA 206 generates alerts, the process may merely switch all clients connected to the access point radio to the radio that is the client. The switching time may be a fraction of the 100-200 millisecond switch time exhibited by a single radio solution.

As discussed above, the Wi-Fi radio may operate either in the Wi-Fi access point mode or in Wi-Fi Client mode. Further, access points may reside in the same channel or may reside on different channel. For example, an access point to a specific store may reside on channel 9 and the home access point may reside on channel 6. As another example, the access point for the specific store and the home access point may be on the same channel.

At 402, the current location of the vehicle may be accessed. As discussed above, the current location may be generated by GPS receiver 220. At 404, the Wi-Fi location-based map may be accessed. Alternatively, the Wi-Fi location-based map may be accessed prior to accessing the current location of the vehicle. At 406, based on the current location and the accessed Wi-Fi location-based map, it may be determined whether there is a potential external Wi-Fi connection. As discussed above, the Wi-Fi location-based map may be indicative of an available Wi-Fi connection (either based on the vehicle building the Wi-Fi location-based map, based on a pre-made Wi-Fi location-based map, or both). Thus, in one implementation, the input to the Wi-Fi location-based map is the GPS coordinates and the output is an indication of an available Wi-Fi connection. In one specific implementation, the output of the Wi-Fi location-based map is an SSID (or other indicator) of an external Wi-Fi access point. In another specific implementation, the output of the Wi-Fi location-based map is an indication that an external Wi-Fi access point is available.

If a potential external Wi-Fi connection is unavailable, flow chart 400 loops back to 402. If a potential external Wi-Fi connection is available, at 408, the system may search for the Wi-Fi signal. At 410, EAPSA decides, based on the search performed at 408, whether a Wi-Fi connection is available by an external Wi-Fi access point. If so, at 412, EAPSA determines whether or how to manage the switch to the external Wi-Fi access point.

Thus, in one implementation, the Wi-Fi access point mode of operation provides Internet connectivity to connected mobile devices by routing data through a modem (e.g., LTE). In the background, the EAPSA may scan (e.g., scans continuously or scans periodically) for known access points using their GPS coordinates and its current location. While scanning for GPS, the EAPSA may also map the signal intensity of the Wi-Fi radio and also may access the signal strength. For example, an access point inside the automobile has several devices (clients) connected to and provides internet connection to all the clients. This is the typical operating condition when using the LTE modem on the antenna. It is possible that the external access points could reside on a channel different from the host in the vehicle. In such an instance the software changes the channel on which it is listening to the Access Point prior to switch. If a stored access point is in close proximity and a request is received to channel switch in the Wi-Fi radio, then the data to the connected mobile devices can be interrupted up to 200 msec. Thus, checking for an external Wi-Fi access point may disrupt Wi-Fi service (and also Internet service) to the connected mobile devices.

Further, the EAPSA may selectively choose when to test for connection to an external access point. For example, the EAPSA tests for an external access point when it determines that there is high probability that a known external access point will be detected. In one specific implementation, this EAPSA test is implemented based on the current location and the Wi-Fi location-based map.

Figure 5:
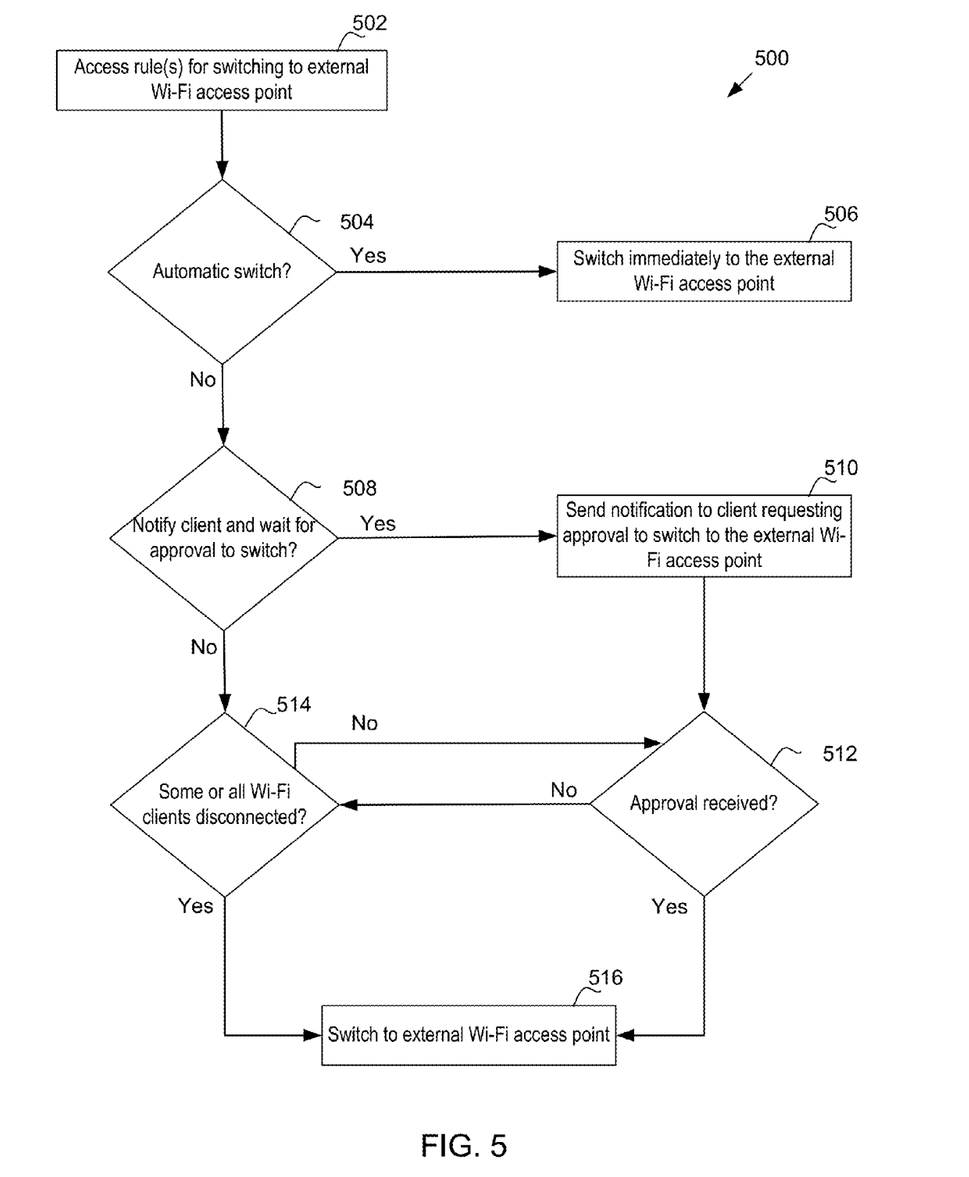
FIG. 5 is a flow diagram for managing switching to the available Wi-Fi connection.

FIG. 5 is a flow diagram 500 for managing switching to the available Wi-Fi connection. As discussed above, the EAPSA may determine that an external access point (such as an external Wi-Fi access point) is available. Responsive to this determination, the EAPSA may manage switching to the external access point. At 502, the EAPSA may access one or more rules for switching to the external Wi-Fi access point. Example rules include, but are not limited to: automatic switch to the external access point; no switching to the external access point until all Wi-Fi connected mobile client devices are disconnected or preferred or prioritized clients have disconnected; or do not switch to the external access point if any Wi-Fi connected mobile client device denies the switch request coming to the phone. The listed rules are merely for illustration purposes; other rules are contemplated.

At 504, the EAPSA determines whether the rule(s) indicate an automatic switch. If so, at 506, the EAPSA immediately switches to the external Wi-Fi access point. Thus, upon switching, the vehicle access point device 102 jettisons all of its Wi-Fi connected mobile client devices and itself becomes a client to the external Wi-Fi access point, and automatically logs into it. The vehicle access point device then becomes a tethered client. The switch may occur within 100-200 milliseconds. Thus, a service disruption may be felt by all the mobile client devices previously connected to the vehicle access point device.

Alternatively, the EAPSA may determine which mobile client devices are connected, and determine whether to immediately switch to the external Wi-Fi access point. For example, the Wi-Fi connected mobile client devices may have an associated priority level. In this regard, the mobile client devices may have an associated predetermined priority. Depending on the associated priority, the EAPSA may determine whether to immediately switch to the external Wi-Fi access point. In particular, if each of the Wi-Fi connected mobile client devices have an associated low priority level, the EAPSA may determine to immediately switch to the external Wi-Fi access point. If one or more of the Wi-Fi connected mobile client devices have an associated high priority level, the EAPSA may determine to wait to switch to the external Wi-Fi access point, and/or may notify the high priority Wi-Fi connected mobile client devices, as discussed below.

If not, at 508, the EAPSA determines whether the rule(s) indicate that approval from the Wi-Fi connected clients is needed prior to a switch being performed. If so, at 510, one or more notifications are sent to the Wi-Fi connected client(s) requesting approval to switch to the external Wi-Fi access point. As discussed above, switching to the external Wi-Fi access point necessitates the Wi-Fi connected client(s) to find a separate means in which to communicate via the Internet. For example, the client may use its own cellular modem (and its own data plan) in order to communicate via the Internet. As another example, the client may search for an external Wi-Fi access point. In that regard, the notice sent from the EAPSA to the client may in one implementation include an identification of the external Wi-Fi access point found by the EAPSA to connect to (e.g., the SSID of the external Wi-Fi access point).

At 512, the EAPSA may determine whether the Wi-Fi connected client(s) sent approval for the switch. If yes, at 516, the EAPSA switches to the external Wi-Fi access point. If not, at 514, the EAPSA determines whether some or all of the Wi-Fi connected client(s) have disconnected. In one implementation, the EAPSA may wait for all of the Wi-Fi connected clients to disconnect. In another implementation, the EAPSA may wait for some of the Wi-Fi connected clients to disconnect (e.g., the Wi-Fi connected clients with higher priority). If so, the EAPSA switches to the external Wi-Fi access point. If not, the EAPSA may wait until some or all of the Wi-Fi connected clients disconnect. If not, the flow diagram loops back to 512.

Similar to the EAPSA sensing a potential connection to an external access point, the EAPSA may monitor to determine movement away from the external access point. Ultimately, the signal may begin to fade to the point of losing the signal.

The EAPSA may monitor the fade to the external access point in one of several ways. In one way, the EAPSA may use the Wi-Fi location-based map to determine when the signal from the external access point will likely fade. For example, the EAPSA may determine, based on the vehicle's current location, and its intended direction of progress as to whether the vehicle is inside or outside of the area designated for the external access point as have sufficient signal coverage. In another way, the EAPSA may monitor the signal with the external access point in real-time to determine when the signal degrades to the point where Internet access will likely be lost.

Before the mobile client devices (previously in Wi-Fi communication with the vehicle access point device) lose their internet connection, EAPSA may thus recognize the condition and generate a call back to the mobile client device. The call back may initiate the switch such that the mobile client device reconnects to the vehicle access point device. Thus, the Wi-Fi radio on the vehicle access point device, which until this reconnection was a client to the external access point, once again becomes an access point, thereby allowing all internal clients a connection to the Internet. This connection is the cellular connection through the onboard LTE modem on the Antenna module. Further, the service disruption suffered by clients may not be more than 100-200 milliseconds.

Figure 6:
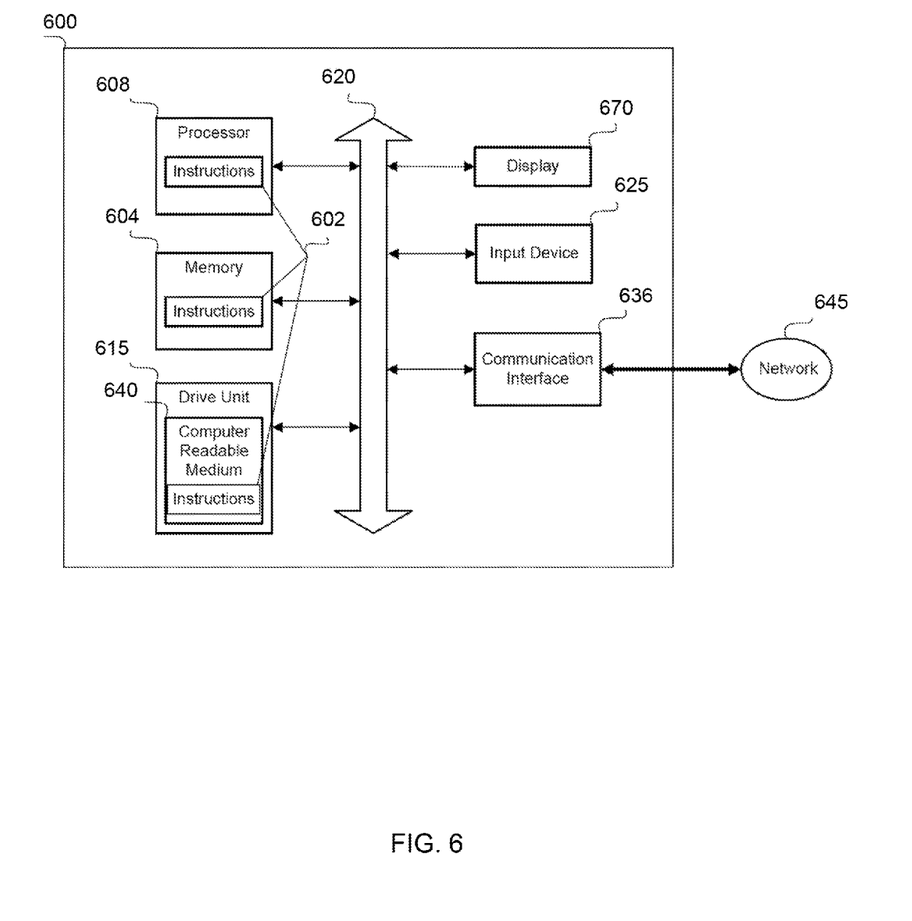
FIG. 6 is a general computer system, programmable to be a specific computer system, which may represent any of the computing devices referenced herein, such as the head unit or the smartphone.

FIG. 6 illustrates a general computer system 600, programmable to be a specific computer system 600, which can represent any server, electronic device or electronic component, such as vehicle access point device 102 or client-connected device 104. The computer system 600 may include an ordered listing of a set of instructions 602 that may be executed to cause the computer system 600 to perform any one or more of the methods or computer-based functions disclosed herein. The computer system 600 can operate as a stand-alone device or can be connected, e.g., using the network 645, to other computer systems or peripheral devices.

In a networked deployment, the computer system 600 can operate in the capacity of a server or as a client-user computer in a server-client user network environment, or as a peer computer system in a peer-to-peer (or distributed) network environment. The computer system 600 can also be implemented as or incorporated into various devices, such as a personal computer or a mobile computing device capable of executing a set of instructions 602 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 600 can include a memory 604 on a bus 620 for communicating information. Code operable to cause the computer system to perform any of the acts or operations described herein can be stored in the memory 604. The memory 604 can be a random-access memory, read-only memory, programmable memory, hard disk drive or any other type of volatile or non-volatile memory or storage device.

The computer system 600 can include a processor 608, such as a central processing unit (CPU) and/or a graphics processing unit (GPU). The processor 608 can include one or more general processors, digital signal processors, application specific integrated circuits, field programmable gate arrays, digital circuits, optical circuits, analog circuits, combinations thereof, or other now known or later-developed devices for analyzing and processing data. The processor 608 can implement the set of instructions 602 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 600 can also include a disk or optical drive unit 615. The disk drive unit 615 can include a computer-readable medium 640 in which one or more sets of instructions 602, e.g., software, can be embedded. Further, the instructions 602 can perform one or more of the operations as described herein. The instructions 602 can reside completely, or at least partially, within the memory 604 or within the processor 608 during execution by the computer system 600.

The memory 604 and the processor 608 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 600 can include an input device 625, such as a keyboard or mouse, configured for a user to interact with any of the components of system 600. It can further include a display 670, such as a liquid crystal display (LCD), a cathode ray tube (CRT), or any other display suitable for conveying information. The display 670 can act as an interface for the user to see the functioning of the processor 608, or specifically as an interface with the software stored in the memory 604 or the drive unit 615.

The computer system 600 can include a communication interface 636 that enables communications via the communications network 645. The network 645 can include wired networks, wireless networks, or combinations thereof. The communication interface 636 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including FIGS. 1-2, may be implemented using the computer functionality disclosed in FIG. 6. Further, the flow diagrams illustrated in FIGS. 3-5 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A vehicle access point management device comprising:
   a communication interface configured to receive information regarding a current location of a vehicle;
   a single Wi-Fi radio;
   a cellular wireless connection;
   mode switcher configured to switch between operating the vehicle access point management device in Wi-Fi access point mode and Wi-Fi client mode, wherein in Wi-Fi access point mode, the vehicle access point management device routes data with one or more Wi-Fi connected external devices via the cellular wireless connection, wherein in the Wi-Fi client mode, the vehicle access point management device routes the data with the one or more Wi-Fi connected external devices via the single Wi-Fi radio to an external Wi-Fi access point; and
   a controller in communication with the communication interface and configured to:
     operate the vehicle access point management device in the Wi-Fi access point mode wherein the one or more Wi-Fi connected external devices communicate via the cellular wireless connection;
     access a location-based access point map indicative of potentially available Wi-Fi access points correlated to geographic locations;
     determine, based on the location-based access point map and the current location of the vehicle, whether the external Wi-Fi access point is potentially available; and
     in response to determining that the external Wi-Fi access point is potentially available:
       stop Wi-Fi communication with the one or more Wi-Fi connected external devices;
       after stopping the Wi-Fi communication with the one or more Wi-Fi connected external devices, search, using the single Wi-Fi radio, to connect to the external Wi-Fi access point that is potentially available;
       connect with the external Wi-Fi access point;

switch, via the mode switcher, to the Wi-Fi client mode; and resume the Wi-Fi communication with the one or more Wi-Fi connected external devices wherein the one or more Wi-Fi connected external devices communicate with the external Wi-Fi access point.

2. The vehicle access point management device of claim 1, wherein the location-based access point map is indicative of potentially available Wi-Fi access points correlated to the geographic locations.

3. The vehicle access point management device of claim 1, wherein the controller is further configured to, responsive to searching to connect to the external Wi-Fi access point that is potentially available:

determine that the external Wi-Fi access point is available to connect; and responsive to determining that the external Wi-Fi access point is available to connect, determine whether to immediately connect to the external Wi-Fi access point.

4. The vehicle access point management device of claim 3, wherein the controller is further configured to communicate via Wi-Fi with one or more mobile devices in the vehicle; and wherein the controller is configured to determine whether to immediately connect to the external Wi-Fi access point based on at least one aspect associated with the one or more mobile devices in the vehicle.

5. The vehicle access point management device of claim 4, wherein the at least one aspect comprises a priority assigned to the one or more mobile devices in the vehicle; and wherein the controller is configured to wait to connect to the external Wi-Fi access point in response to determining that the priority assigned to the one or more mobile devices in the vehicle is greater than a predetermined priority.

6. The vehicle access point management device of claim 4, wherein the at least one aspect comprises whether the one or more mobile devices are currently communicating via Wi-Fi with the single Wi-Fi radio; and wherein the controller is configured to wait to connect to the external Wi-Fi access point in response to determining that the one or more mobile devices in the vehicle are currently communicating via Wi-Fi with the single Wi-Fi radio.

7. The vehicle access point management device of claim 1, wherein the controller is configured to determine whether the external Wi-Fi access point is potentially available is based on cost incurred to connect to the external Wi-Fi access point; and responsive to determining a lowest cost for a respective access point, the controller is configured to connect to the respective access point.

8. A method comprising:

receiving information regarding a current location of a vehicle;

operating a vehicle access point management device in a Wi-Fi access point mode using a mode switcher, wherein the mode switcher is configured to switch between operating the vehicle access point management device in the Wi-Fi access point mode and Wi-Fi client mode, wherein in the Wi-Fi access point mode, the vehicle access point management device routes data with one or more Wi-Fi connected external devices via a cellular wireless connection, wherein in the Wi-Fi client mode, the vehicle access point management device routes the data with the one or more Wi-Fi connected external devices via a single Wi-Fi radio to an external Wi-Fi access point;

accessing a location-based access point map indicative of potentially available Wi-Fi access points correlated to geographic locations;

determining, based on the location-based access point map and the current location of the vehicle, whether the external Wi-Fi access point is potentially available; and in response to determining that the external Wi-Fi access point is potentially available:

stopping Wi-Fi communication with the one or more Wi-Fi connected external devices;

after stopping the Wi-Fi communication with the one or more Wi-Fi connected external devices, searching, using the single Wi-Fi radio, to connect to the external Wi-Fi access point that is potentially available;

connecting with the external Wi-Fi access point;

switching, via the mode switcher, to the Wi-Fi client mode; and resuming the Wi-Fi communication with the one or more Wi-Fi connected external devices wherein the one or more Wi-Fi connected external devices communicate with the external Wi-Fi access point.

9. The method of claim 8, wherein the location-based access point map is indicative of potentially available Wi-Fi access points correlated to the geographic locations.

10. The method of claim 8, further comprising, responsive to searching to connect to the external Wi-Fi access point that is potentially available:

determining that the external Wi-Fi access point is available to connect; and responsive to determining that the external Wi-Fi access point is available to connect, determining whether to immediately connect to the external Wi-Fi access point.

11. The method of claim 10, further comprising:

communicating via the single Wi-Fi radio with one or more mobile devices in the vehicle; and determining whether to immediately connect to the external Wi-Fi access point based on at least one aspect associated with the one or more mobile devices in the vehicle.

12. The method of claim 11, wherein the at least one aspect comprises a priority assigned to the one or more mobile devices in the vehicle; and wherein determining whether to immediately connect to the external Wi-Fi access point comprises waiting to connect to the external Wi-Fi access point in response to determining that the priority assigned to the one or more mobile devices in the vehicle is greater than a predetermined priority.

13. The method of claim 11, wherein the at least one aspect comprises whether the one or more mobile devices are currently communicating via Wi-Fi with the single Wi-Fi radio; and wherein determining whether to immediately connect to the external Wi-Fi access point comprises waiting to connect to the external Wi-Fi access point in response to determining that the one or more mobile devices in the vehicle are currently communicating via Wi-Fi with the single Wi-Fi radio.

14. The method of claim 8, wherein determining whether the external Wi-Fi access point is potentially available is based on cost incurred to connect to the external Wi-Fi access point; and responsive to determining a lowest cost for a respective access point, connecting to the respective access point.

15. A vehicle access point management device comprising:
 a communication interface configured to receive information regarding a current location of a vehicle;
 a Wi-Fi radio;
 mode switcher configured to switch between operating the Wi-Fi radio in Wi-Fi access point mode and Wi-Fi client mode, wherein in Wi-Fi access point mode, the Wi-Fi radio is configured to provide communication to one or more Wi-Fi connected external devices via cellular communication, wherein in Wi-Fi client mode, the Wi-Fi radio is configured to provide communication to the one or more Wi-Fi connected external devices via an external Wi-Fi access point, and
 a controller in communication with the communication interface and configured to:
  operate the Wi-Fi radio in the Wi-Fi access point mode such that the one or more Wi-Fi connected external devices communicate via cellular communication;
  access a location-based access point map indicative of potentially available Wi-Fi access points correlated to geographic locations;
  determine, based on the location-based access point map and the current location of the vehicle, whether the external Wi-Fi access point is potentially available; and
  in response to determining that the external Wi-Fi access point is potentially available:
   search, using the Wi-Fi radio, to connect to the external Wi-Fi access point that is potentially available;
   in response to determining that the external Wi-Fi access point is available, determine whether to wait to connect with the external Wi-Fi access point;
   monitor communication with the one or more Wi-Fi connected external devices;
   determine, based on the monitored communication, to connect with the external Wi-Fi access point; and
   in response to determining to connect with the external Wi-Fi access point, switch, via the mode switcher, to the Wi-Fi client mode so that the one or more Wi-Fi connected external devices communicate with the external Wi-Fi access point.

16. The vehicle access point management device of claim 15, wherein the controller is configured to monitor communication with the one or more Wi-Fi connected external devices by determining whether the one or more Wi-Fi connected external devices have ceased communicating via Wi-Fi; and
 responsive to determining that the one or more Wi-Fi connected external devices have ceased communicating via Wi-Fi, the controller is configured to determine to connect to the external Wi-Fi access point.

17. The vehicle access point management device of claim 15, wherein the controller is configured to monitor communication with the one or more Wi-Fi connected external devices by determining whether the one or more Wi-Fi connected external devices have sent an indication of approval to switch to the external Wi-Fi access point; and
 responsive to determining that the one or more Wi-Fi connected external devices have sent the indication of approval to switch to the external Wi-Fi access point, the controller is configured to determine to connect to the external Wi-Fi access point.

* * * * *